Oct. 9, 1962   R. J. KIRCH   3,057,014
METHOD OF CONSTRUCTING A POTENTIOMETER HOUSING
Filed Dec. 5, 1960

INVENTOR.
ROBERT KIRCH
BY Louis J. Knobbe
HIS ATTORNEY

United States Patent Office 3,057,014
Patented Oct. 9, 1962

3,057,014
METHOD OF CONSTRUCTING A POTENTIOMETER HOUSING
Robert James Kirch, deceased, late of Newport Beach, Calif., by Olive V. Kirch, administratrix, Costa Mesa, Calif., assignor to Beckman Instruments, Inc., a corporation of California
Filed Dec. 5, 1960, Ser. No. 73,921
6 Claims. (Cl. 18—55)

The present invention relates to potentiometer housings and a method of constructing same and, more particularly, to housings for potentiometers employing helically wound resistance elements.

Potentiometer housings are normally fabricated from dielectric materials such as organic plastics or from metals with a dielectric material subsequently applied over the metal. In the case of a multi-turn potentiometer, the housing may take the form of a cup or a tube, onto the inside surface of which is machined a groove to receive a helical resistive element. This groove may be either a radius or a V, but it is of constant, predetermined pitch.

One of the measures of accuracy in a potentiometer is its linearity tolerance. The linearity tolerance figure indicates the maximum deviation of the actual output of a potentiometer from a theoretically linear output for any given angular displacement of the potentiometer shaft. In practice, a truly linear potentiometer can not be produced because of certain inherent inaccuracies in designs, materials and fabrication methods. The sources of inaccuracies may be either electrical or mechanical; this invention is concerned only with inaccuracies which are attributable to mechanical sources. These mechanical inaccuracies are due to eccentricities between the lid and the lid mounting diameters of the potentiometer housings, out-of-roundness of the housing member, or taper of the inside diameter of the housing. The mechanical inaccuracies are primarily a result of the method of fabricating the housings and the limitation of the machines used in the fabrication process.

A typical housing fabrication process starts with the provision of a piece of plastic tube cut slightly longer than the desired finished length. Centerless grinding techniques are then used to reduce the outside diameter to within a specified dimensional tolerance. The tube is then placed in a machine which faces both ends, after which the prepared tube is mounted in the chuck of a lathe. Three machine operations are then performed on the same chucking, these operations being specifically, forming the front and rear lid mounting shoulders and machining the resistance coil mounting groove on the inside diameter of the tube.

The disadvantages of the machine operations described above are that they are not only time consuming and expensive, but that they frequently contribute to undesired out-of-roundness of the potentiometer housings. This mechanical inaccuracy may be caused by distorting the housing when it is clamped in a fixture during the machining operation.

One conceivable method of fabricating a housing would be to mold the helical coil mounting groove and the front and rear lid mounting shoulders. However, shrinkage causes the mold piece to tightly adhere to a threaded mold core, making its removal very difficult and time consuming. A tapered core, while alleviating the core removal problem, results in an undesired tapered helical groove.

The present invention provides a method of molding potentiometer housings considerably different from the presently accepted concept in the industry. This method provides improved potentiometer housings with accuracies equal to or better than housings constructed by prior art techniques, and moreover, does so at a significant reduction in cost due to the elimination of a preponderance of the machining operations.

It is therefore an object of this invention to provide a method of constructing potentiometer housings which eliminates the necessity of clamping the housing in a fixture and machining the resistance coil mounting groove and the front and rear lid mounting shoulders.

A further object of this invention is to provide a method of molding complete potentiometer housings which obviates the necessity of tapering the helical coil mounting groove.

It is still another object of this invention to provide improved potentiometer housings having a helical thread of constant diameter and lid mounting shoulders maintained in close concentricity with the helical thread.

Other objects of this invention will be apparent as the description proceeds.

Briefly, in accordance with one aspect of the present invention, the housing member is prepared by molding a tube from the preferred material. The mold core comprises a plunger into which is formed a partial thread of predetermined pitch, resembling a common machine tap with alternate threaded and grooved sections around its periphery. Metal keys ground to fit the grooves around the core periphery form a removable part of the plunger assembly, with one key supplied for each groove. With the plunger assembled in a mold cylinder, the cylinder is charged with the appropriate molding material. After completion of the molding cycle, the plunger assembly is removed from the cavity, the molded piece being removed with the core. The keys are then ejected, and the molded piece is rotated a predetermined portion of a complete 360° rotation and removed, the threaded portions being passed through the grooves formed by the keys. The accuracy of the finished housing approaches that of the accuracy of the plunger. Since the plunger can be constructed to very close dimensions, the resultant housings are very accurate and, moveover, the same accuracy is maintained from housing to housing without the variations produced by the prior art processes.

A more thorough understanding of the invention may be obtained by a study of the following detailed description taken in connection with the accompanying drawings in which.

Figure 1:
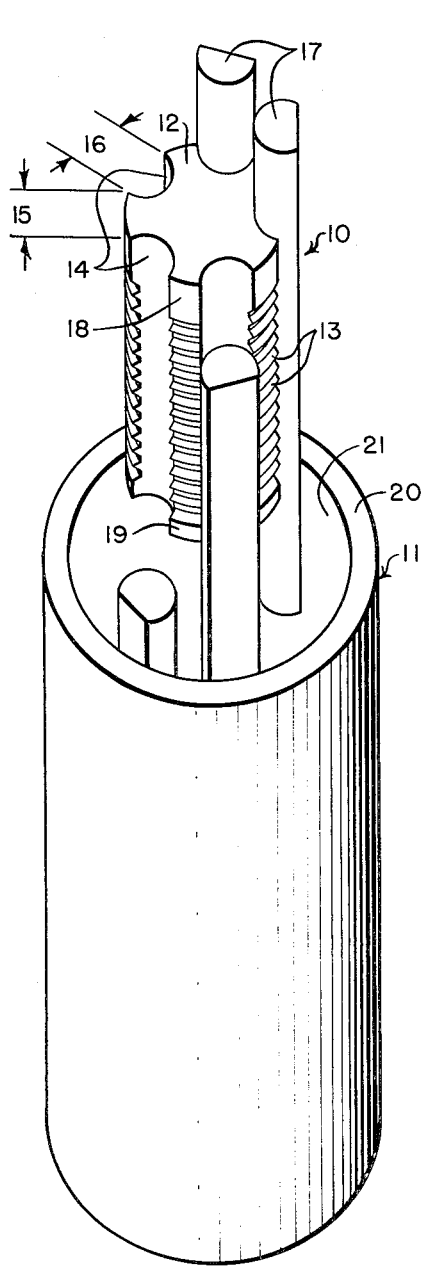
FIG. 1 is a perspective view of the mold core and cavity.
Figure 2:
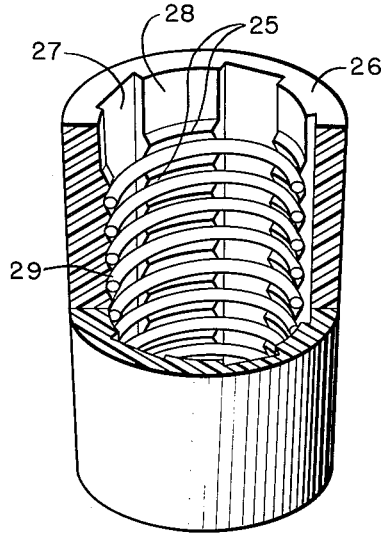
FIG. 2 is a perspective view of a potentiometer housing constructed in accordance with the present invention.

In a preferred form of the present invention, a potentiometer housing is prepared by a molding operation employing a mold core 10 and a mold cylinder 11 illustrated in FIG. 1. A finished potentiometer housing constructed in accordance with this invention is illustrated in FIG. 2. A representative potentiometer in which the housing of this invention may be used to advantage is shown in Patent No. 2,361,070 of H. H. Cary et al., entitled "Variable Resistor" and assigned to Beckman Instruments, Inc., assignee of the present invention.

Referring now to FIG. 1, the mold core 10 comprises a plunger 12 into which is formed a partial thread 13 of a predetermined pitch, corresponding to the desired pitch of the potentiometer helical winding. Uniformly spaced on the peripheral surface of the plunger 12 are five grooves 14, resulting in a structure quite similar in appearance to a common machine tap with alternate threads 13 and grooves 14 around its periphery. Although the number of threads and grooves shown in FIG. 1 is five, it will be understood from the following description that a greater or lesser number may be employed in accordance with the invention.

The relative dimensions of threads 13 (dimension 15)

and groove 14 (dimension 16) may be varied, but as will be seen later, the width 15 of each threaded section must always be less than the width 16 of the grooved section adjacent therewith.

A plurality of metal keys 17, each of which is ground to fit a corresponding core groove 14, forms a removable part of the plunger assembly, with one key being supplied for each groove. The keys may be tapered to facilitate their removal during the molding process since, as hereinafter noted, their taper does not affect linearity of the potentiometer winding.

The mold core 10 further includes two potentiometer lid mounting shoulders 18 and 19 which are accurately ground onto the peripheral face of the plunger 12 and maintained in close concentricity with threads 13. These shoulders define the accuracy with which the front and back potentiometer lids are mounted on the molded housing. Although the mold shown in FIG. 1 is designed for producing a cylindrical housing having open faces on both ends thereof, it will be apparent that a cup shaped housing may also be molded according to this invention, in which case the shoulder 19 would not be necessary.

The mold cylinder 11 may comprise a hollow cylindrical element 20 having a cavity 21 which defines the outside periphery of the molded potentiometer housing. In accordance with normal molding practice, the interior of the cavity may be tapered to facilitate removal of the molded piece. The dimensional accuracy of cavity 21 is not important as it does not control the accuracy of the molded housing, e.g., any eccentricity of the outside periphery of the molded housing from a perfect cylinder does not affect the housing accuracy since the peripheral surface is not used as a register diameter for forming the inner helical thread. The accuracy of the mold cylinder is therefore easily within commercially acceptable molding tolerance.

The initial steps in constructing a potentiometer in accordance with this invention will vary slightly in accordance with the molding technique employed. For thermosetting materials, either compression or transfer molding procedures may be used. In compression molding, the cavity 21 is first charged with an appropriate molding material. A preferred material is glass-filled diallyl phthalate resin, although other thermosetting plastics and also thermoplastics or metals may be similarly employed. The second step comprises inserting the plunger 12 with a key 17 retained in each of the grooves 14 into the mold cavity 21, after which the mold is closed.

In transfer molding, the plunger with keys attached is inserted into the mold as the first step of a molding sequence. The mold is then closed. The second step comprises injecting pre-heated molding material into the closed mold.

After a molded piece is formed, the molding cycle is completed. The third step of the process of the invention comprises removing the newly molded piece along with the plunger 12 and the keys 17 from the mold cavity 21. The fourth step of the process comprises ejecting each of the keys 17. If the potentiometer housing is formed as an open cylinder, the keys may be pushed from one face of the cylinder so as to be ejected out of the other face. If the housing is formed as a cup shaped member with one face integrally molded, the keys may be ejected by pulling them through the single open face. As heretofore noted, the keys may be tapered to facilitate their removal.

It will now be evident that the plunger 12 is retained to the molded piece by a face-to-face contact of the threads 13 with newly molded threads 25 shown on the molded potentiometer housing of FIG. 2. As is also shown in FIG. 2, each of the threaded sections of molded piece 26 are adjacent groove sections 27 formed by the keys 17. As heretofore noted, the width 16 of each of the keys 17 and core grooves 14 is greater than the width 15 of the adjacent threaded sections. In the mold core illustrated in FIG. 1, these required dimensions are conveniently provided by making the widths 15 of the threaded sections the same and the widths 16 of the grooved sections the same with width 16 greater than width 15. A mold core so constructed forms the housing of FIG. 2 wherein the widths of the grooved sections 27 are greater than adjacent threaded sections. The fifth and final step of the process comprises rotating plunger 12 relative to the molded piece until each threaded section of the plunger is disposed in the adjacent grooved section 27 of greater width. Although shrinkage will cause the threads molded in the piece 26 to tightly surround the threaded plunger 12, the plunger need only be rotated a portion of one revolution to free the two members. This has been found to be entirely practicable, and does not require any tapering of the threaded plunger portions 13. The molded piece 26 may then be withdrawn from the plunger by passing the threaded plunger sections through molded grooves 27.

The resultant potentiometer is shown in FIG. 2 in cut-away view with the core removed. A resistance element 28 may be placed in the newly formed threads 25 in any of the ways presently known in the potentiometer art. As is clearly shown in this illustration, a tapering of the keys will result in a tapering only of the grooves 27. These grooves are used only for removal of the mold core and do not affect the mounting of the resistance element 28.

As previously mentioned, mechanical inaccuracies are primarily a result of eccentricity between the potentiometer coil and the lid mounting shoulder of the housing, or in the taper of the coil groove from end-to-end. But referring to FIG. 2 it will be seen that the concentricity between coil groove thread 25 and the lid mounting shoulder 28 of the molded housing 26 will be determined by the accuracy which is built into the lid mounting shoulder 18 of the plunger 12 of FIG. 1 and will not deviate from housing to housing.

As is apparent from the foregoing description, this invention eliminates all major machining operations. The finished housing is therefore of a consistently high degree of mechanical accuracy and further is constructed at a significant cost saving.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

What is claimed is:

1. A method of constructing a housing for a potentiometer employing a helically wound resistance element comprising a first step of inserting a mold core into a mold cavity, said mold core including a generally cylindrically shaped plunger having alternate threaded and grooved sections on the peripheral surface thereof and a plurality of keys mating with said grooves, the threads on said threaded section having a predetermined pitch corresponding to the desired pitch of the helical resistance element and each of said grooved sections having a width greater than an adjacent threaded section; a second step of charging the mold cavity with molding material and forming a molded piece; a third step of removing the molded piece with the mold core from said mold cavity; a fourth step of removing said keys from between said plunger and the molded piece; and a fifth step of rotating said plunger relative to the molded piece a partial revolution and removing the threaded portions of said plunger through grooves formed in said molded piece by said keys.

2. A method of constructing a housing for a potentiometer employing a helically wound resistance element comprising the step of inserting a helically threaded mold core into a mold cavity, said thread corresponding in pitch to the desired pitch of the helical resistance element, the step of charging the mold cavity with molding material and forming a molded piece; the step of removing a plurality of elements uniformly spaced about the circumference of said mold core to form a plurality of grooves, each groove having a width greater than an adjacent threaded section; and the step of rotating said core relative to the molded piece a partial revolution and removing the threaded portions of said core through said grooves.

3. A method of constructing a housing for a potentiometer employing a helically wound resistance element comprising the step of inserting a mold core into a mold cavity, said mold core having a generally cylindrically shaped body including an end shoulder having a diameter corresponding to the diameter of the potentiometer lid and a threaded portion having a pitch corresponding to the pitch of the helical resistance element; the step of charging the mold cavity with molding material and forming a molded piece; the step of removing a plurality of elements about the circumference of said mold core to form a plurality of grooves, each groove having a width greater than an adjacent threaded section of said mold core; and the step of rotating said core relative to the molded piece a partial revolution and removing the threaded portions of said core through said grooves.

4. A method for constructing a housing for a potentiometer employing a helically wound resistance element comprising a first step of charging a mold cavity with molding material; a second step of inserting a mold core into said mold cavity, said mold core including a generally cylindrically shaped plunger having alternate threaded and grooved sections on the peripheral surface thereof and a plurality of keys mating with said grooves, the threads on said threaded section having a predetermined pitch corresponding to the desired pitch of the helical resistance element and each of said grooved sections having a width greater than an adjacent threaded section; a third step of removing the molded piece with the mold core from said mold cavity; a fourth step of removing said keys from between said plunger and the molded piece; and a fifth step of rotating said plunger relative to the molded piece a partial revolution and removing the threaded portions of said plunger through grooves formed in said molded piece by said keys.

5. A method of constructing a housing for a potentiometer employing a helically wound resistance element comprising the step of charging a mold cavity with molding material; the step of inserting a helically threaded mold core into said mold cavity, said thread corresponding in pitch to the desired pitch of the helical resistance element; the step of removing a plurality of elements uniformly spaced about the circumference of said mold core to form a plurality of grooves, each groove having a width greater than an adjacent threaded section; and the step of rotating said core relative to the molded piece a partial revolution and removing the threaded portions of said core through said grooves.

6. A method of constructing a housing for a potentiometer employing a helically wound resistance element comprising the step of charging the mold cavity with molding material; the step of inserting a mold core into said mold cavity, said mold core having a generally cylindrically shaped body including an end shoulder having a diameter corresponding to the diameter of the potentiometer lid and a threaded portion having a pitch corresponding to the pitch of the helical resistance element; the step of removing a plurality of elements about the circumference of said mold core to form a plurality of grooves, each groove having a width greater than an adjacent threaded section of said mold core; and the step of rotating said core relative to the molded piece a partial revolution and removing the threaded portions of said core through said grooves.

References Cited in the file of this patent

UNITED STATES PATENTS

| | | |
|---|---|---|
| 1,852,502 | Brown | Apr. 5, 1932 |
| 2,557,918 | Schmid | June 19, 1951 |
| 2,676,371 | Venner et al. | Apr. 27, 1954 |
| 2,769,203 | Wood | Nov. 6, 1956 |
| 2,815,422 | Lock | Dec. 3, 1957 |
| 2,821,006 | Pfannmuller et al. | Jan. 28, 1958 |
| 2,822,600 | Scott | Feb. 11, 1958 |
| 2,859,316 | Miller | Nov. 4, 1958 |
| 2,890,490 | Morin | June 16, 1959 |
| 2,970,343 | Johnson et al. | Feb. 7, 1961 |